US008677894B2

(12) United States Patent
Turgeman et al.

(10) Patent No.: US 8,677,894 B2
(45) Date of Patent: Mar. 25, 2014

(54) DEVICE FOR PREPARING OLIVE PASTE FOR OIL EXTRACTION

(75) Inventors: Eric Turgeman, Rishpon (IL); Yariv Gershony, Hod Haharon (IL)

(73) Assignee: Olive X-Press Ltd., Hod-Hasharon (IL)

( * ) Notice: Subject to any disclaimer, the term of this patent is extended or adjusted under 35 U.S.C. 154(b) by 135 days.

(21) Appl. No.: 13/195,039

(22) Filed: Aug. 1, 2011

(65) Prior Publication Data

US 2013/0034643 A1 Feb. 7, 2013

(51) Int. Cl.
*A23D 9/04* (2006.01)
*B02C 2/02* (2006.01)

(52) U.S. Cl.
USPC ........... 99/510; 241/198.1; 241/220; 241/244

(58) Field of Classification Search
USPC ......... 99/510, 513, 495, 509; 241/228, 152.2, 241/82.5
See application file for complete search history.

(56) References Cited

U.S. PATENT DOCUMENTS

| | | | | |
|---|---|---|---|---|
| 2,119,972 | A * | 6/1938 | Steinbiss | 100/110 |
| 2,466,443 | A * | 4/1949 | Klaassen | 241/66 |
| 4,852,814 | A * | 8/1989 | Amiot et al. | 241/37.5 |
| 6,269,741 | B1 * | 8/2001 | Young | 100/113 |
| 2003/0207007 | A1 | 11/2003 | Mailland et al. | |
| 2006/0065133 | A1 | 3/2006 | Moline | |
| 2006/0191425 | A1 | 8/2006 | Chang | |
| 2008/0196601 | A1 * | 8/2008 | Scott | 99/495 |
| 2011/0045151 | A1 | 2/2011 | Padan et al. | |

FOREIGN PATENT DOCUMENTS

| | | | |
|---|---|---|---|
| DE | 3712042 | | 10/1998 |
| DE | 19948493 | | 4/2001 |
| EP | 574364 | A1 * | 12/1993 |
| EP | 1903094 | | 3/2008 |
| EP | 1908524 | | 4/2008 |
| EP | 1908524 | A1 * | 4/2008 |
| ES | 2192155 | A1 * | 9/2003 |
| FR | 549517 | | 2/1923 |
| FR | 2422713 | A * | 12/1979 |
| GB | 491106 | | 8/1938 |
| GB | 2022124 | | 12/1979 |
| GB | 2200124 | A * | 7/1988 |
| IT | 1167646 | B * | 5/1987 |
| IT | 1247395 | B * | 12/1994 |
| IT | 1266459 | B * | 12/1996 |
| IT | 1302667 | B * | 9/2000 |
| IT | 1306742 | B * | 10/2001 |
| WO | WO 9904655 | A1 * | 2/1999 |
| WO | WO 2004011580 | A1 * | 2/2004 |
| WO | WO2010007610 | | 1/2010 |
| WO | WO 2010007610 | A1 * | 1/2010 |

* cited by examiner

*Primary Examiner* — Dana Ross
*Assistant Examiner* — John J Norton
(74) *Attorney, Agent, or Firm* — Soroker-Agmon

(57) ABSTRACT

A device and method for processing aggregate material, in particular for preparing olive paste for the extraction of oil. The device includes a housing having an inlet for receiving aggregate material, a driving shaft coinciding with the central longitudinal axis of the housing, a crushing drum mounted on an eccentric segment of the driving shaft, free to rotate thereabout, and a final grinder located downstream from the crushing drum.

13 Claims, 8 Drawing Sheets

DEVICE FOR PREPARING OLIVE PASTE FOR OIL EXTRACTION

FIELD OF THE INVENTION

The present invention generally relates to olive oil production and more specifically to a device and method for preparing olive paste from whole olives.

BACKGROUND OF THE INVENTION

Olive oil production is a traditional industry originating in the Mediterranean and known since as early as 3,000 B.C. In recent years, the olive oil market has been growing dramatically. The increasing interest in olive oil stems from both its unique rich taste and its health benefits and coincides with the growing public awareness to health food, as well as with the general increasing interest in gourmet food. Indeed, olive oil is considered by many to be superior to other vegetable oils. However, olive oil is also one of the most adulterated agricultural products. Customers are therefore becoming increasingly aware of the possibility that oil distributed as high quality olive oil is actually adulterated oil mixed with, or even consists almost entirely of inferior oils of lower cost. The awareness to health food products, as well as to their freshness and authenticity, has brought with it a new trend of small scale production of basic food products (e.g. bread) for self consumption at home or in small food establishments such as restaurants, delicatessen and specialized boutiques. In accordance with this trend, small scale appliances, sized to be placed on a kitchen counter, such as bread machine, home-use coffee roasting device, etc., are now gaining popularity. With respect to olive oil, recent years show an increasing number of olive oil boutiques which specialize in production of high quality oil by careful selection of olives and a close control over production. A household countertop cold press machine for producing small quantities of olive oil designed by the inventors of the present invention is described in international publication WO2010/007610.

The oil in olives is accumulated in the mesocarp cells, mostly in the vacuoles and to a smaller extent in the cytoplasm. The first stage in the process of olive oil extraction from whole olives is to crush or grind the olives into an olive paste (mash), which contains both broken olive pits (stones) and mashed flesh. Typically, crushing or grinding is followed by malaxation (slow mixing) of the paste to facilitate breaking of the oil-containing cells to release the oil and to allow coalescence of the oil droplets and separation of the liquids from the solids. The sharp stone particles present in the paste facilitate the breaking of the cellular material. The liquid, which contains both oil and vegetation water, is then extracted from the paste by applying pressure or centrifugation. Depending on the specific method and equipment, the separation of the paste into liquid and solid and the separation of the liquid into oil and water may be performed sequentially (two-phase separation) or concurrently (three-phase-separation)

The present invention focuses on the first step of the olive oil production, namely the preparation of the olive paste from whole olives.

The olive stone (pit) has an exceptionally rigid structure. Invoking the initial collapse/breakage of the stone requires a certain critical force, while further breakage of the initial fragments into smaller ones requires forces of an order of magnitude smaller. The critical force may be of up to, or even more than, about 40 kg, depending on the stone's size.

Traditionally, olive paste was prepared by millstones. Nowadays, modern olive oil plants commonly use a hammer mill which operates at high rotational speeds to impact the olives, tear their flesh and break their stones. Although, the use of hammer mills is advantageous over traditional millstones with respect to capacity, efficiency and costs, it does affect the quality of the olive oil. Because of the high rotational speed of the hammers, the impact results in overheating of the processed olives and even more significantly, in a transient high increase of the local temperature at the impact's site, which might even reach a temperature as high as boiling temperature. The overheating has certain disadvantages with respect to the oil quality and might compromise its health beneficial and organoleptic properties. Indeed, it is believed that olive oil prepared by modern technology is somewhat inferior to oil produced by traditional techniques where the processing is much slower.

It is one object of the invention to provide method and device for processing olives into a paste which overcome the above drawbacks and which can be implemented in, but are not limited to, a small-scale countertop home appliance.

It is another object of the invention to provide a method and device for crushing/grinding aggregate material, such as olives, which are low speed and low torque, therefore preventing overheating and maintaining low temperatures throughout the olive oil processing.

Other advantages of the present invention will become apparent from the following description.

SUMMARY OF THE INVENTION

One aspect of the present invention is a mill device for processing aggregate material. The device is particularly suitable for preparing olive paste from whole olives for the extraction of olive oil. The device comprises a housing having an inlet for receiving aggregate material, a driving shaft provided with an eccentric segment, a crushing drum mounted on the eccentric segment within the housing and a final grinder located downstream from the crushing drum. The rotational axis of the driving shaft coincides with the central longitudinal axis of the housing. The crushing drum has a peripheral wall dimensioned to leave a free volume between the drum and the inner wall of the housing. The final grinder comprises a perforated plate having at least one opening and at least one blade or wing rigidly connected to the driving shaft upstream of the perforated plate. The crushing drum is nonrigidly mounted on the eccentric segment and is free to rotate about the drum's central axis. An anti-friction bearing may be provided between the drum and the eccentric segment. The central longitudinal axis of the housing and the central drum axis are preferably parallel to each other. The housing is provided with at least one lateral opening located downstream the perforated plate for diverting processed material outside said housing.

In accordance with certain embodiments of the invention, the mill device may further comprise a feeding auger concentrically and rigidly mounted on driving shaft upstream of the crushing drum and/or a lower auger concentrically and rigidly mounted on the driving shaft between the crushing drum and the final grinder.

In accordance with certain embodiments of the invention, the peripheral wall of the crushing drum comprises at least two vertical sections of increasing diameters in the downstream direction.

Another aspect of the invention is an olive oil extractor device comprising the mill device of the invention. The olive oil extractor device may also comprise a malaxation bowl. In accordance with certain embodiments of the invention, the mill device is mounted within the malaxation bowl and the malaxation paddles may be coupled to the driving shaft of the mill device. Also in accordance with certain embodiments of the invention, the oil extractor device may further comprise a sleeve surrounding the housing of the mill device at a distance apart therefrom, defining a space between the sleeve and the housing, wherein the sleeve comprises a mesh configured to allow liquids to pass through into said space and to hold back solids.

Yet, another aspect of the invention is a method for preparing olive paste from whole olives comprising: feeding whole olives into an eccentric crusher configured for breaking the olives' stones, to obtain an olive mass containing broken stone segments, and grinding the obtained olive mass. The eccentric crusher comprises a crushing drum mounted on an eccentric segment of a driving shaft within a housing, wherein the drum is free to rotate about the central axis of the drum and wherein the drum is dimensioned to leave a free volume between its peripheral wall and the housing. The step of grinding may comprise pressurizing obtained olive mass through a perforated plate in a first direction and rotating a blade or teeth through said pressurized olive mass in a second direction traversing the first direction. The method may further comprise a step of extracting oil from said olive paste.

In the context of the present invention the terms "olive mash" and "olive paste" are used interchangeably to describe a "tapenade-like", paste of ground whole olives which contains mashed olive flesh and broken pieces of olive stones, preferably of a diameter in the range of 1 to 3 mm. In such a paste, the broken pieces of the stones facilitate releasing of the oil in the next malaxation step.

In the context of the present invention the terms "upstream" and "downstream" refer to the flow of the processed material. An element located upstream of a second element means that the processed material encounters this element before it encounters the second element. Although the device of the invention is preferably of a vertical configuration such that its main longitudinal axis coincides with gravitation, other configurations with different orientations are also possible. Accordingly, in the following detailed description, the terms 'upper', 'lower' 'height', 'top', 'bottom', etc., are not limited to a vertical orientation but should be understood as relating to the process direction.

BRIEF DESCRIPTION OF THE DRAWINGS

The present invention will be better understood and appreciated from the following detailed description taken in conjunction with the drawings, which should be considered as non-limitative and/or non binding with respect to the inventive concept on which the invention is based.

DETAILED DESCRIPTION OF THE INVENTION

Figure 1:
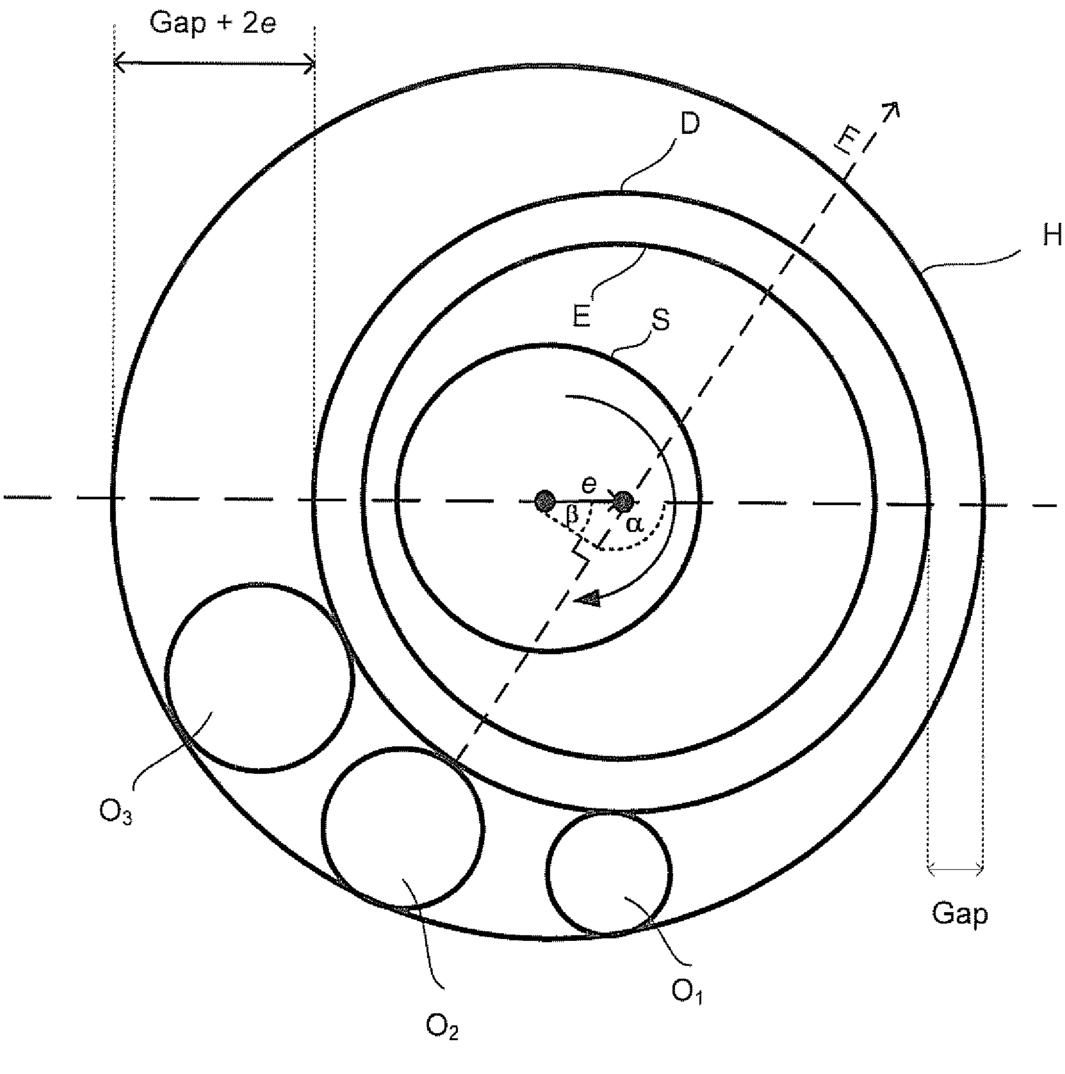
FIG. 1 is a schematic illustration demonstrating the operation of the eccentric crusher of the invention.
Figure 2A:
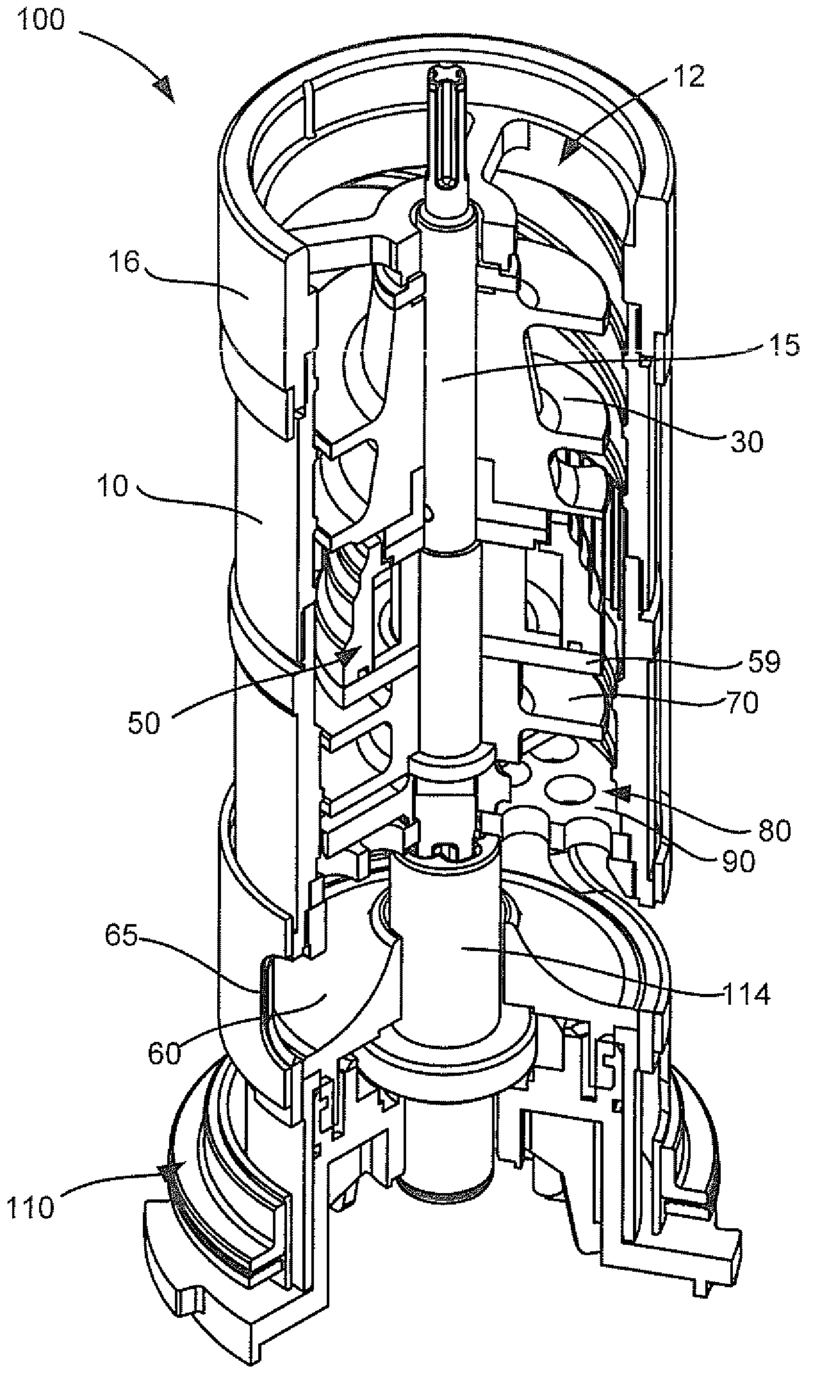
FIGS. 2A and 2B are two cut away isometric views of a crusher/grinder assembly in accordance with an embodiment of the invention.
Figure 2B:
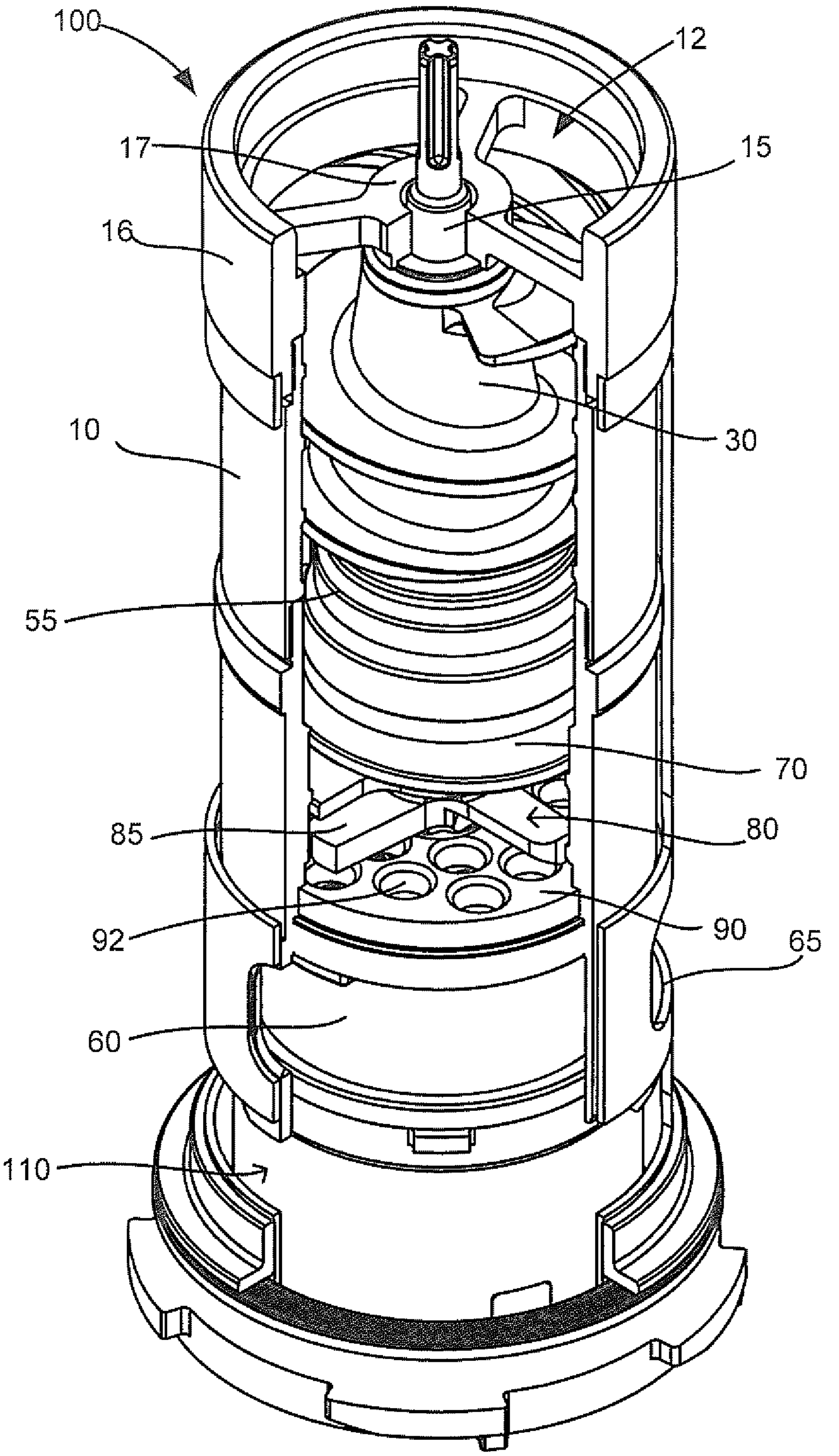
Figure 3A:
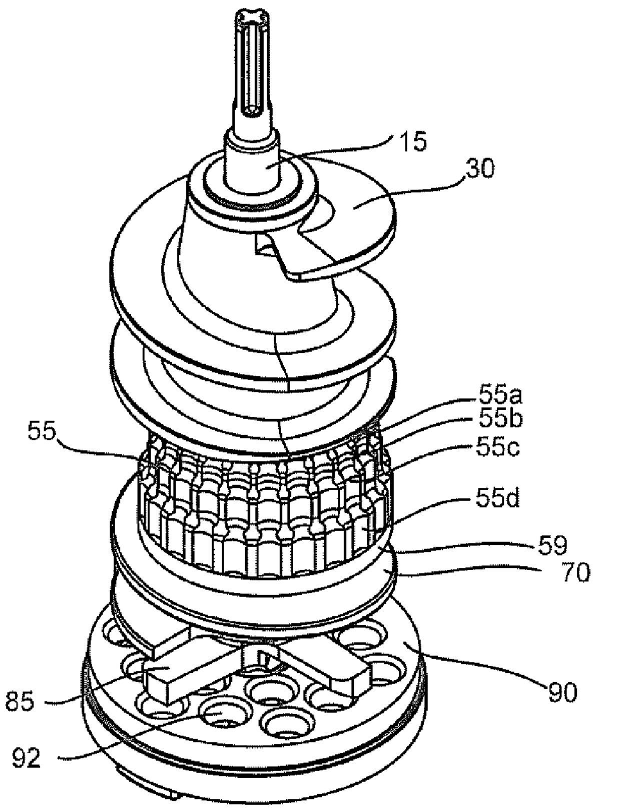
FIG. 3A is an isometric view of the assembled inner parts of the crusher/grinder assembly of FIG. 2.
Figure 3B:
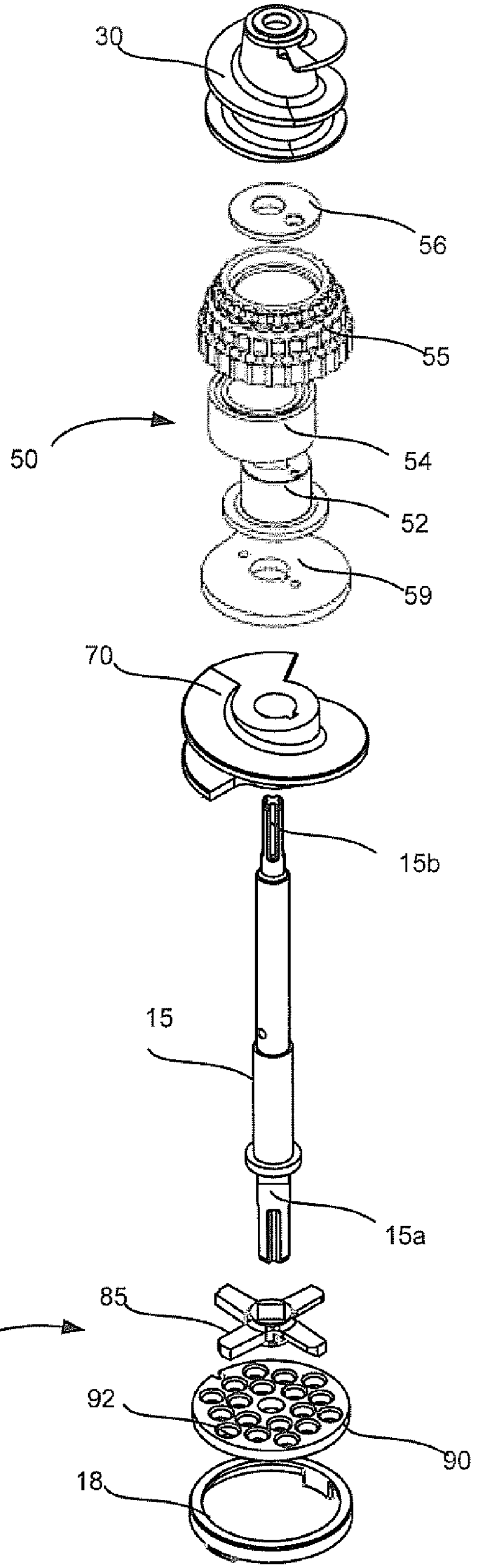
FIG. 3B is an exploded isometric view of the disassembled inner parts of FIG. 3A.

The present invention provides a novel device and method for the preparation of olive paste from whole olives for subsequent processing of the paste to extract olive oil. The device and method of the invention are particularly directed to a device for preparing olive paste which can be used in conjunction with, or as part of, a small-scale countertop home appliance, such as the olive oil extraction device described in WO2010/007610. However, the novel device and method of the invention are not limited to small-scale production or to a specific configuration of an olive oil extraction apparatus but can be exploited for medium and large-scale production as well. Likewise, although the invention is described in the context of olive oil production, the device and method of the invention are not limited for this purpose but may be used for crushing/grinding other particulate substances, including plants and seeds such as coffee beans, chickpeas, nuts, etc.

As discussed above, the initial collapse/breakage of the olive stone requires a critical force of about 40 kg for larger stones. Depending upon the mechanical approach/solution of breaking the stone, this force can be induced by:

a. Impact of a high speed rotating inertial mass, such as the hammer mill which is typically used in the first stage of modern olive oil industry; or b. Moment, where the rotational speed is relatively low and torque on the motor is the product of the force multiplied by the armature to the place where force is induced, such as in a conical burr grinder or meat mincer; or c. "Partial" moments, where the speed is relatively low and the armature on the motor shaft is lower than the actual distance to where the force is being induced.

The present invention is based on the third option, as will be explained in detail in the following.

As mentioned above applying the force by high speed rotating inertial mass, as in the hammer mill, involves overheating which has adverse effects on the oil quality. It will be also realized that speed and torque are related to the motor power and size. A high power large motor is not suitable for a countertop home appliance device where space is limited.

The present invention is aimed at providing a low speed, low torque process for breaking the olive stone. The low speed process prevents overheating during olive processing. Maintaining low temperatures throughout the olive oil processing is critical for the quality and health benefits of the produced oil. Additionally, low torque and speed result in a small, light and low energy consumption motor which is suitable for a home appliance. Low speed also reduces noises and enables sharing the same rotational speed of different phases in the process.

The device and method of the invention are based on a first stage of crushing the whole olives by an eccentric crusher. The eccentric crusher comprises a drum which is eccentrically mounted within a cylindrical housing, such that the gap between the drum and the housing wall varies with rotation about the housing's longitudinal axis. Olives, trapped between the drum and the housing, are gradually squeezed and deformed until the force applied reaches the critical value and their stones are crushed by the drum against the housing inner wall. In accordance with the invention, the drum is mounted on an eccentric means, such as an eccentric sleeve, which is rigidly attached to the main shaft and rotates therewith. However, the drum itself is not rigidly fixed to the eccentric sleeve but is free to rotate about its own center.

FIG. 1 is a schematic illustration demonstrating the operation of the eccentric crusher of the invention. A crushing drum D is eccentrically mounted about a rotating shaft S which rotates about the central axis of housing H, by means of an eccentric segment E, which is rigidly connected to shaft S. The central longitudinal axes of the housing H and the drum D are parallel to each other. The gap between the drum and the housing, at any point along the circumference of the housing, changes while the shaft rotates, varying from a minimum "Gap" to a maximum "Gap+2*e", e being the amount of eccentricity, i.e., the distance between the centers of the housing and the drum (designated by the left and right blackened circles, respectively). As shaft S rotates, olives of different stone's sizes, e.g., $O_1$, $O_2$, $O_3$, are trapped between drum D and housing H at different approaching angles Alpha ($\alpha$) with reference to the axis between the rotation center and the eccentricity center and are subject to forces when the gap between the eccentric drum and the housing decreases. Once the gap is smaller than the obstacle (the olive stone), the rotating shaft is subjected to a moment at a magnitude of the force multiplied by the eccentricity e and cos($\beta$), $\beta=\alpha-90$ (with ($e*\cos\beta$) being the equivalent armature). This approach allows for reducing the moments required from the driving system. Because the drum is free to rotate about its own center, friction forces are not transferred to the shaft. It will also be realized, that unlike a hammer mill or a conical grinder, where crushing is achieved through friction and/or cutting/abrasion forces, according to the present invention, crushing the olive stone is achieved by pressure rather than by friction.

In this context it should be noted that depending on the coupling between drum D and eccentric E, and as long as the drum is not rigidly connected to the eccentric but is free to rotate about its own center, other forms of crushers can be designed in which the drum does not follow the full circular movement of the eccentric E. For example, the coupling between the drum and the eccentric can be designed such as to only allow the drum to move along a line, for example, by mounting the drum to the eccentric by means of a rectangular slit. Similarly, the coupling between the drum and the eccentrics can be designed such as to allow the drum to follow any polygonal route.

In accordance with certain embodiments of the invention, the crushing drum may comprise several vertical sections of different diameters, or steps, increasing in size in the direction of the flow, for generating smaller gaps and to allow crushing the processed material into smaller segments. A drum of stepped profile also allows for 'trapping' olives of different sizes. Each olive cultivar has different overall typical/mean size and different typical/mean stone size. A crushing drum with several stages will crack an olive stone only when the stone is trapped between the drum and the housing at an intermittent gap larger than the minimum gap. The olive stone shows no flexibility and breaks just above its "critical pressure/stress" point. At this stage the stone breaks into several arbitrary segments that have sharp edges which are beneficial for the subsequent malaxation phase.

Alternatively, the crusher may comprise a series of independent cascading drums of increasing diameters. Additionally, the drum surface may be constructed with a rough or serrated surface to create better friction/grip with the processed material.

Referring now to FIGS. 2 to 5 and 7, there is shown a crusher/grinder assembly, generally designated 100, in accordance with an embodiment of the invention. Assembly 100 comprises a cylindrical housing 10, an eccentric crusher, generally designated 50, and a final grinder, generally designated 80. In accordance with the embodiment shown here, assembly 100 further comprises an upper (feeding) auger 30 positioned upstream of eccentric crusher 50 and a lower auger 70 positioned between eccentric crusher 50 and final grinder 80. However, in accordance with another embodiment of the invention, the crusher/grinder assembly does not include an upper auger and/or a lower auger.

A driving shaft 15, coupled to a motor (not shown), extends along the central longitudinal axis of housing 10 rotating thereabout. Assembly 100 has a general rotor-stator configuration where shaft 15 and the parts mounted thereon consists the rotor while housing 10 consists the stator.

Figure 4A:
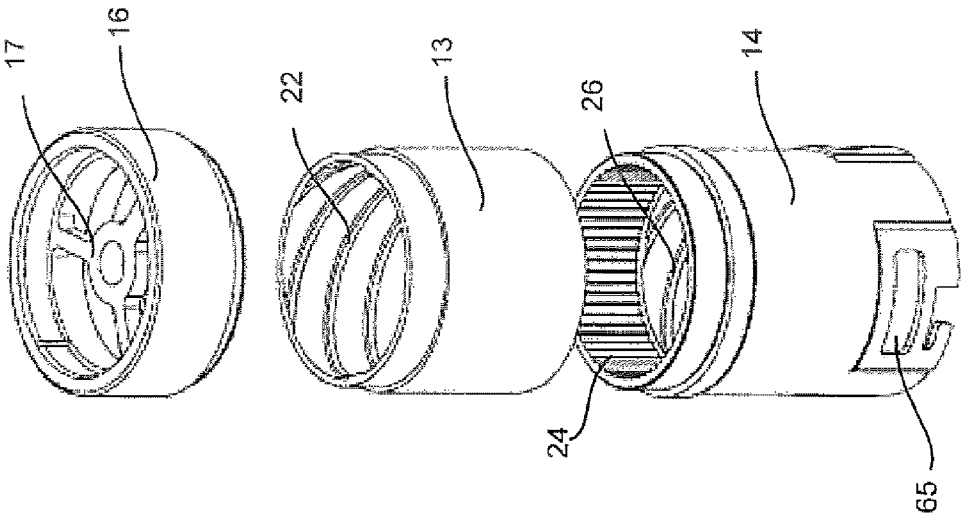
FIG. 4A is an exploded isometric view of the disassembled housing.
Figure 4B:
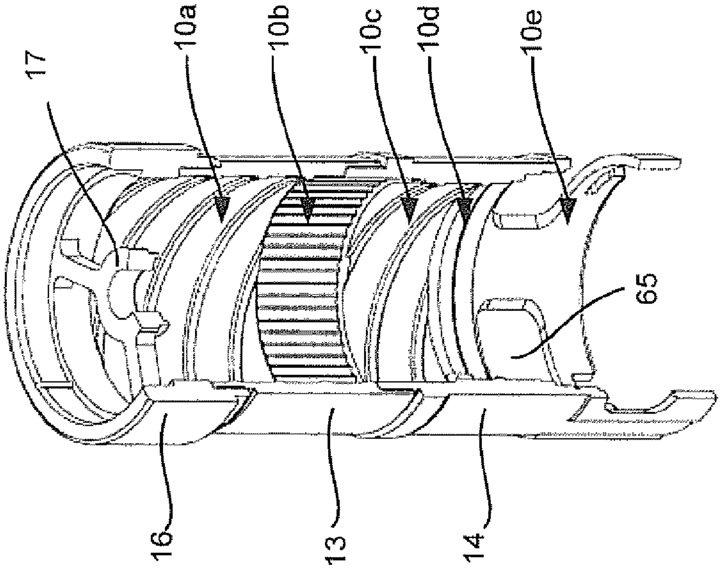
FIG. 4B is a cut away isometric view of the assembled housing.
Figure 4C:
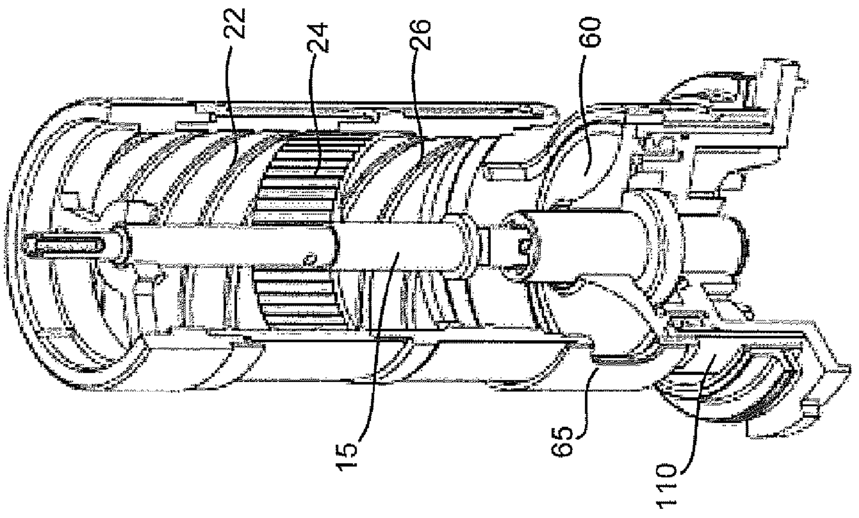
FIG. 4C is a cut away isometric view of the assembled housing, shaft and the driving shaft housing.

Housing 10 has an upper opening 12 through which olives are fed to be processed. As best shown in FIGS. 4*b* and 4*c*, housing 10 is distinguished by five different sections wherein each section inherits features that comply with the process taken at that section, as will be explained in detail below. Housing 10 may be constructed from several parts that can be merged into a single segment or be further segmented. FIGS. 4*a* and 4*b* depict housing 10 made of two cylindrical parts 13 and 14 configured to be connected by snap fit or any other suitable means. An upper end ring 16 is placed onto housing 10 for securing the assembly and supporting shaft 15 by means of central ring 17. The lower portion of bottom part 14 is provided with openings 65 through which the olive paste exits the crusher/grinder assembly for further processing.

Upper auger 30, located below opening 12, serves to feed the olives into the eccentric crusher at a specific volumetric rate and at a specific predetermined relative angle, whereas the relative angle is with reference to the eccentricity of the crusher. The auger is a form of a worm or thread pump. Furthermore, auger 30 facilitates compression of the olives downstream. Optionally, auger 30 deforms the olives into a "certain" dimensional "package"; whereas "package" refers to the fact that an olive can be deformed while compressed so that the olive flesh is the distorted element. Optionally, the auger may comprise a sharp edge at the auger root (not shown) to facilitate slitting the olive flesh. The auger compresses the olive till the stone emerges partially or fully from the olive flesh.

Upper auger 30 is characterized by the entrance aperture or section area, the number of beginnings, the root and external diameters, the pitch along its longitudinal axis, the exit aperture or section area and the number of beginnings and tooth profile of ribs 22 on the inner housing wall. An auger with a specific set of parameters inherits specific volumetric characteristics subject to its geometry, its rotational speed and flow regime around it. The auger volumetric throughput is subject to its geometric characteristics and the method of its attachment to the shaft. In accordance with different embodiments of the invention, auger 30 may be coupled to shaft 15 either continuously or intermittently. By intermittently coupling and decoupling the auger to the motor, it is possible to control the flow rate of the feed. Intermittent coupling can be achieved by means of a clutch mounted between the shaft and the auger. For example, the auger may be mounted on the shaft and loaded by a spring, with a groove on the auger that is coupled to a notch on the shaft. The auger is coupled once the spring is at work length and decoupled when the spring is compressed, enabling to disengage the auger groove from the shaft notch. Pressure that is induced on the auger exit surface due to "over feed" may be used for actuating the coupler, thus controlling the amount of processed olives in the auger enabling to control the mass rate of the auger.

Eccentric crusher 50 comprises a crushing drum 55 coupled to shaft 15 by means of an eccentric sleeve 52 which is eccentric to the rotation axis of shaft 15. Preferably, the eccentricity is in the range of 0.5 to 3 mm. A bearing 54 is placed between eccentric sleeve 52 and crushing drum 54 (see FIG. 3*b*) to facilitate free rotation of drum 55 around its own axis protected by bearing shield cover 56. Yet, according to another embodiment of the invention, the eccentric means may be an eccentric segment integrally formed on the shaft. In accordance with such an embodiment, the housing may be made of two longitudinal halves that are attached to each other after the inner parts are assembled on the shaft.

In accordance with the embodiment shown here, crushing drum 55 comprises four vertical sections, 55*a* to 55*d*, of increasing diameters from top to bottom. However, it will be easily realized that in accordance with other embodiments of the invention, the drum may comprise only one section or may comprise any number of vertical sections. Sections 55*a* to 55*d*, each characterized by both its diameter and height, are concentric to one other, forming a different gap with the housing. Preferably, drum 55 has a serrated surface to enhance grip of the processed material.

An orifice plate 59 is located at the bottom of the eccentric crusher 50 aimed at governing the maximum size of particles exiting the eccentric crusher into the next phase. Orifice plate 59 is dimensioned to form an orifice of a predetermined size between the housing and the plate and rotates in phase with crushing drum 55.

A lower auger 70 for controlling the feeding of the crushed olives and stones into the final grinder 80 is located below eccentric crusher 50. The design considerations for auger 70 are similar to those described above in association with upper auger 30 with respect to desired volumetric and flow rate. It will be noted that lower auger 70 might be unnecessary in cases where upper auger 30 generates sufficient feeding pressure to push the material through to the shear chamber of final grinder 80.

Final grinder 80 comprises a pressurized shear chamber 10*d* (see FIG. 4C) for further processing the olive flesh and olive peel in order to make them more suitable/ready for malaxation and may induce further breakage of the broken segments of the olive stones. Preferably, the stone segments in the final olive paste are of dimensions in the range of 1 to 3 mm.

The pressurized shear chamber 10*d* is defined between lower auger 70 and perforated plate 90 and comprises a rotating set of teeth or blades 85 which are coupled to rotating shaft 15. Perforated plate 90 is a metallic plate provided with an array of slits or holes 92. The pressurized media moves into the chamber and is pressed by auger 70 whilst rotating teeth/blades 85 further shear/grind the compressed olive paste. Plate 90 exerts further shear effect on the ground olives which exit through slits 92. Shear rotating teeth/blades 85 are characterized by their number, the blade's cross section, the ratio between the volume they occupy to the pressurized chamber volume and by their distance above plate 90. Preferably, teeth/blades 85 are positioned at a predetermined distance 94 (see in FIG. 7) above plate 90 in order to reduce the operating noise. However, blades 85 may be positioned in direct contact with plate 90. In such a "mincer" configuration, shear is induced on the media between slits 92 and the rotating teeth 85. Plate 90 is characterized by the open area/close area ratio (mesh), the openings' shape, its thickness, It will be realized that a lower mesh and a thicker plate will induce increase in flow resistivity through the plate that will increase the pressure and reduce the flow rate and vice versa. The characteristics of plate 90 as well as those of teeth/blades 85 are selected in accordance with the desired texture and desired production rate of the final product, subject to the geometrical and power constraints of the designed device.

A radial diverting cup 60, located below plate 90 and having concave surface (best seen in FIG. 7), receives the processed material which leaves the pressurized shear chamber through plate 90 and diverts the processed material in the radial direction to exit housing 10 through openings 65.

In accordance with certain embodiments of the invention, all the round/rotating elements interfacing with the shaft may be grouped into one bulk module or a "compound" shaft, which includes shaft 15 with upper auger 30, the eccentric segment 54 (but not crushing drum 55), slit plate and lower auger 70. This in return results in a more rigid and easily mass produced product and facilitates disassembly, cleaning and maintenance. In this context, one way to assemble the crushing drum is by splitting it into two symmetrical elements that can be assembled onto the "compound" shaft.

As mentioned above, housing 10 comprises five different sections, each of which includes features that comply with the process taken at that section. Referring back to FIGS. 4*b* and 4*c*, the uppermost section 10*a*, below ring 16, is where upper auger 30 is accommodated. In this section, the inner wall of housing 10 is provided with a set of helically curved ribs 22 compatible with the helical shape of upper auger 30 and evenly distributed around the inner circumference. Below this is the eccentric crusher chamber 10*b*, where the crusher drum 55 is mounted to shaft 15. In this section, the inner surface of the housing is engraved longitudinally along that section to enhance the surface roughness/friction to form a set of vertical ribs 24. Yet, in accordance with other embodiments of the invention, the vertical ribs can be replaced by a set of helical ribs evenly distributed around the housing circumference. Next below the eccentric crusher chamber is the housing section 10*c* that houses lower auger 70. In this section the inner wall of housing 10 is provided with a set of helically curved ribs 26 evenly distributed around the inner circumference and compatible with the helical shape of lower auger 70. Ribs 26 may continue further downward into the pressurized shear chamber 10*d* of final grinder 80 located next below. The bottom of the pressurized shear chamber 10*d* is defined by perforated plate 90 which is attached to the housing by means of ring 18 (shown in FIG. 3B). The pressurized shear chamber is characterized by its height or volume. Finally, the lowest section 10*e* of housing 10 comprises openings 65 through which the processed material exits assembly 100.

Preferably, all the parts of crusher/grinder assembly 100 are made of non-corrosive, food compatible material, preferably a metal such as stainless steel. The rotational speed of shaft 15 depends on the desired capacity and processing rate. The rotational speed is preferably in the range of 50 to 1000 rpm. For a home appliance device the rotational speed is preferably in the range of 50-250 rpm. For a medium or large-scale production, the speed may be up to 1000 rpm or even higher, but will still be significantly lower than the speed of a hammer mill of the same capacity.

Figure 5:
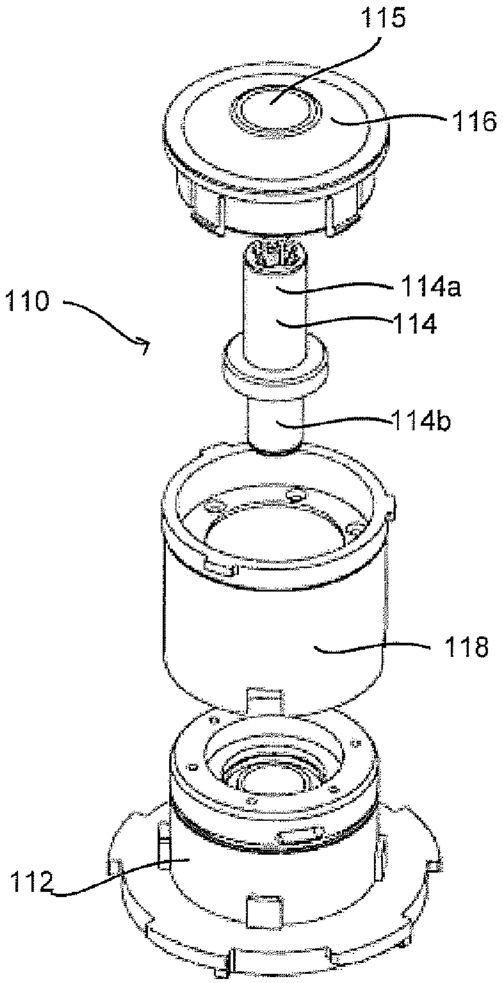
FIG. 5 is an exploded isometric view of an embodiment of a driving shaft housing for the crusher/grinder assembly.

FIG. 5 depicts the parts of a driving shaft housing 110 on which crusher/grinder 100 is mounted, which enables coupling driving shaft 15 to a motor shaft. Driving shaft housing 110 comprises a base part 112, configured to receive coupler 114, a cover 116 having an opening 115 through which the upper part of coupler 114 extends upwardly, and a reinforcing fastening ring 118. The upper end 114*a* of coupler 114 receives end 15*a* of shaft 15 while its lower end 114*b* connects to a motor shaft. Cover 116 seals the lower end of housing 10 defining the bottom of radial diverting cup 60.

In operation, an olive enters the upper port of the upper ring 12 facing the rotating inlet of upper auger 30 that is characterized with a section area size that will allow a whole olive to enter. Auger 30 forces the olive to move downward. Due to the auger specific parameters, an olive of type "A" will also be deformed when exiting the auger whilst an olive of type "B" not necessarily. The olive deformation is dependent on the relation between the type of olive to the exit port or auger cross section, whereas 'type' refers only to the olive's geometric proportions. The upper auger exit port is positioned at a specific angular position with respect to the eccentric crusher, referred to hereunder as the "introduction phase".

Next the olive is introduced to the eccentric crusher chamber 10*b*. Crusher drum 55 is characterized by four vertical sections 61 to 64 of increasing diameters distributed along the height of the drum, each of which is defined by a respective gap and is further characterized by its height. The different gaps allow a cascade of deformation and crushing parameters on a single crusher drum. The olive is introduced to the eccentric crusher chamber 10*b* at an introduction phase whereas dimensions at the auger exit port correspond to a gap which is slightly larger than the mean stone size of the largest olive cultivar. The olive flesh and stone are pushed or fall at the introduction phase in between the rotating crusher drum 55 and the housing 10. As shaft 15 rotates, the gap becomes smaller and consequently the olive is further deformed. Once the olive is deformed it has a lower dimension and therefore proceeds to the next crusher vertical section. The olive proceeds in downward movement with relation to the crusher drum up to the point where the stone is wedged at a "crushing" gap. A 40 kg to 10 kg force (depending on olive stone size that is related to different olive cultivars) force is exerted onto the stone up to the point where the stone cracks. The oily and wet media is also clogged between the engraving on the outer surface of crusher drum 55 and the inner wall of housing 10 and crushed. Orifice plate 59 allows only a certain size of processed media to pass through it, thus preventing olives from simply going through the crushing drum without being crushed and cracked.

The lower auger 70 receives the processed media coming out of orifice plate 59. Coupled to the main shaft, the lower auger acts like a thread pump, pressurizing the processed olives against shear plate 90. The auger incorporated with a helix tooth or set teeth (more than one start), together with the corresponding housing set of ribs, transforms the processed olives through the rotating shear teeth/blades 85.

The shear teeth are coupled to the shaft and cut through the compressed olive paste placed within the pressurized chamber. Preferably, shear teeth 85 are positioned between lower auger 70 and shear plate 90 without touching either, hovering therebetween. As the pressure rises and while shear takes place processed media at a size lower than the slits 92 exit the compressed chamber towards radial diverting cup 60 which diverts the processed media in the redial direction through openings 65. Shear and pressure crack the large stone segments to smaller ones so that they finally exit the shear plate.

It will be realized that the crusher/grinder assembly of the invention can be a stand-alone device for preparing olive paste from whole olives. The olive paste disposed through openings 65 can then be further processed for extracting the oil by any known technique and/or apparatus. Yet, in accordance with some embodiments of the invention, the crusher/grinder assembly can be incorporated into a countertop olive oil extractor device, such as for example the oil extractor device described in WO2010/007610.

Another embodiment of a countertop olive oil extractor device will now be described with reference to FIGS. 6 to 8, according to which—crusher/grinder assembly 100 is coaxially positioned within a malaxation bowl such that the olive paste exiting assembly 100 directly flows into the malaxation bowl to be further processed for extracting the oil. In accordance with this embodiment, both the crushing/grinding phase and the malaxation phase are driven by the same motor. Further in accordance with this embodiment, assembly 100 is concentrically housed within a cylindrical liquid/solid separating mesh sleeve 120 which is made almost entirely of a filter configured for allowing liquids to pass through while holding back solids. The filter may be made from stainless steel, polymer mesh or any other food-compatible material.

Figure 6:
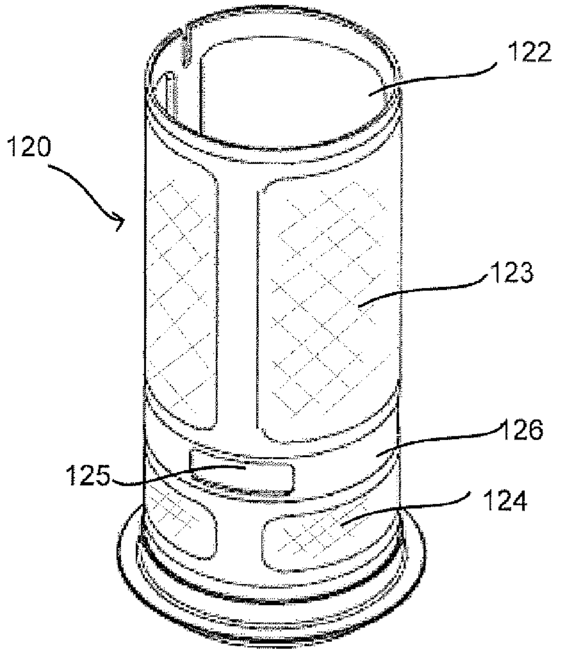
FIG. 6 is an isometric view of an embodiment of a liquid/solid separation mesh sleeve.
Figure 7:
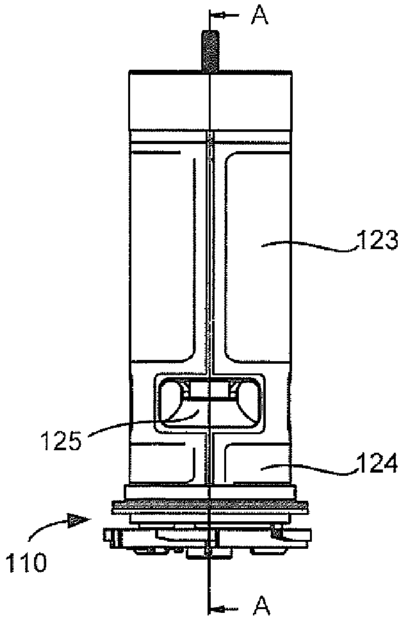
FIG. 7 is plan side view of the crusher/grinder assembly positioned inside the liquid/solid separation mesh sleeve.
Figure 7A:
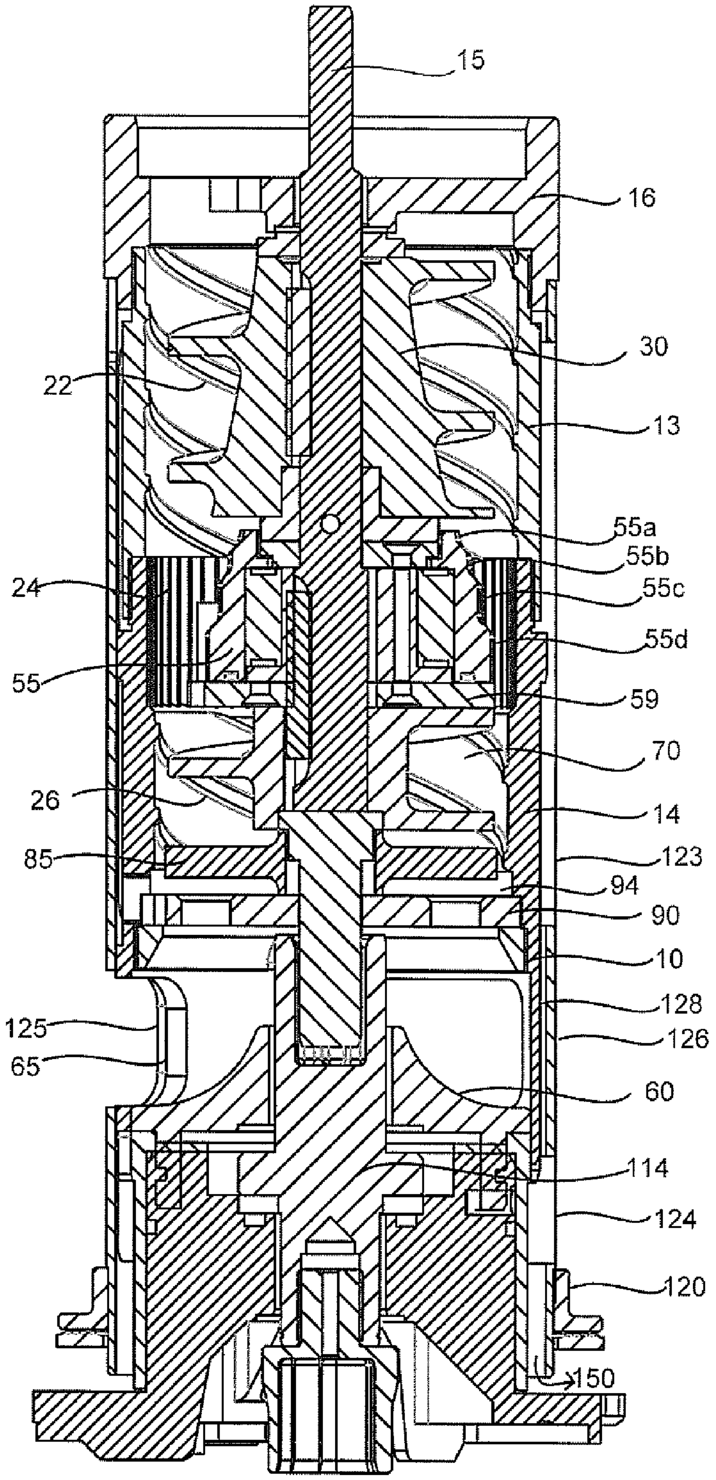
FIG. 7A is a cross sectional view taken along line A-A of FIG. 7.

Referring to FIG. 6, sleeve 120 comprises a cylindrical frame 122 which frames upper and lower filter mesh sections 123 and 124, respectively. Between mesh 123 and mesh 124, frame 122 comprises a solid section 126 provided with openings 125. Openings 125 are substantially of the same dimensions as openings 65 of housing 10 and are designed to snug fit onto openings 65 when housing 10 is positioned within sleeve 120 to allow the olive paste leaving housing 10 to enter the malaxation bowl. Sleeve 120 is separated from housing 10 by a predetermined distance (see FIG. 7) forming an annular space 128 around housing 10, into which liquids extracted from olive paste in the malaxation bowl enter through filter meshes 123 and 124. Annular space 128 is interrupted around openings 65, 125, which are sealed to each other, to separate between the olive paste exiting through the openings and the liquids that fill space 128.

Figure 8:
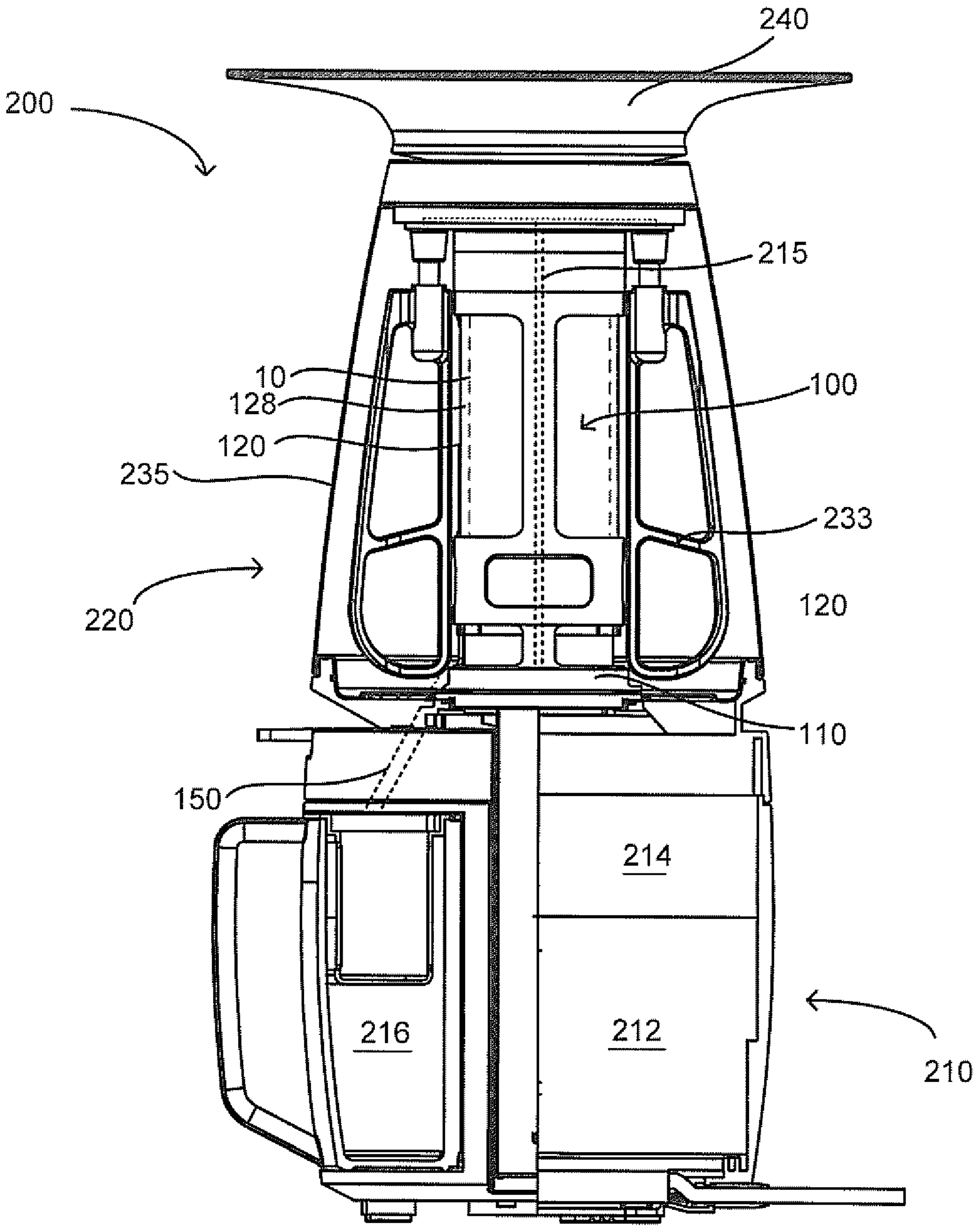
FIG. 8 is a simplified schematic illustration of an embodiment of an olive oil extractor device comprising a crusher/grinder assembly of the invention.

FIG. 8 is a schematic drawing of an embodiment of an olive oil extraction device comprising the novel crusher/grinder assembly of the invention. The oil extracting device, generally designated 200, comprises a chassis 210, which includes a motor 212, gearbox 214 and a liquid container 216, and an upper part 220, which includes the crusher/grinder assembly 100 (the details of which are not shown in FIG. 8) and liquid/solid separator mesh sleeve 120 positioned concentric with malaxation bowl 230. Oil extractor device 200 further includes an open-top hopper 240 for pouring the olives into the crusher/grinder assembly 240 through a lower outlet which opens into the upper feeding auger or directly into the eccentric crusher chamber (both not shown). A shaft 215 (shown by broken lines) coupled to the axis of motor 212 by means of driving shaft housing 110 of FIG. 5 extends through and above crusher/grinder assembly 100. Two or more malaxation paddles 235 are mounted on the upper end of shaft 215 hanging downwardly therefrom into malaxation bowl 230. In accordance with the embodiment shown here, malaxation paddles 235 are formed as a closed loop with a reinforcing rib 233. However, it will be easily realized that other shapes of paddles are possible. The paste leaving crusher/grinder assembly 100 enters malaxation bowl 230 where it undergoes malaxation by means of malaxation paddles 235. Liquids separated from the paste pass/seep through filters 123 and 124 into annular space 128 between housing 10 (shown in broken line) and sleeve 120 and are drained downward toward liquid draining channel 150, situated at the base of driving shaft housing 110, to be collected at oil container 216. In the embodiment shown here, the crushing/grinding and the malaxation mechanisms are both driven by shaft 215. Typically, malaxation is performed at a rotational speed lower than that of the crushing/grinding process. Accordingly, malaxation paddles 235 are preferably coupled to shaft 215 by means of a speed reducing gear (not shown) that reduces the rotational speed of the paddles to preferably about 10 to 150 rpm.

It will be appreciated by persons skilled in the art that the present invention is not limited to what has been particularly shown and described hereinabove. Rather the scope of the present invention is defined only by the claims which follow.

The invention claimed is:

1. A device for processing aggregate material comprising:

a housing having an inlet for receiving aggregate material, the housing having a central longitudinal axis and an inner wall;

a driving shaft having a rotation axis coinciding with said central longitudinal axis within said housing;

an eccentric segment, which is rigidly connected to the driving shaft, so that it rotates with the driving shaft eccentrically;

a crushing drum mounted on said eccentric segment within said housing to rotate with the eccentric segment, wherein the drum has a peripheral wall dimensioned to leave a gap between said peripheral wall and said inner wall of said housing, wherein the size of the gap at any point on the inner wall varies between a minimal size to a maximal size as the drum is rotated;

a final grinder located within said housing downstream of said crushing drum, the final grinder comprising a perforated plate having at least one opening and at least one blade or wing rigidly connected to said driving shaft upstream of said perforated plate.

2. The device of claim 1 wherein said drum has a central drum axis and wherein the drum is free to rotate about said central drum axis.

3. The device of claim 1 further comprising an anti-friction bearing between said drum and said eccentric segment.

4. The device according to claim 2 wherein the central longitudinal axis of said housing and said central drum axis are parallel to each other.

5. The device of claim 1 further comprising a feeding auger concentrically and rigidly mounted on said driving shaft upstream of said crushing drum.

6. The device of claim 1 further comprising a lower auger concentrically and rigidly mounted on said driving shaft downstream of said crushing drum.

7. The device of claim 1 wherein said peripheral wall of the crushing drum comprises at least two vertical sections of different diameters.

8. The device of claim 7 wherein said at least two vertical sections are of increasing diameters in the downstream direction.

9. The device of claim 1 wherein the housing comprises at least one lateral opening located downstream said perforated plate for diverting processed material outside said housing.

10. The device of claim 1, further comprising a malaxation bowl.

11. The device of claim 10, wherein the housing of the device is mounted within the malaxation bowl.

12. The device of claim 11 wherein the device further comprises two or more malaxation paddles coupled to said driving shaft.

13. The device of claim 11 further comprising a sleeve surrounding the housing at a distance apart therefrom, defining a space between the sleeve and the housing, wherein said sleeve comprises a mesh configured to allow liquids to pass therethrough into said space and to hold back solids.

* * * * *